United States Patent [19]
Hodge

[11] Patent Number: 5,226,581
[45] Date of Patent: Jul. 13, 1993

[54] METHOD OF RETROFITTING METAL FIBER FELT IN POLYMER FILTRATION DEVICES

[75] Inventor: Cecil Hodge, Manning, S.C.

[73] Assignee: Filtration & Coating Services, Inc., Manning, S.C.

[21] Appl. No.: 893,973

[22] Filed: Jun. 3, 1992

[51] Int. Cl.⁵ .............................................. B23P 6/00
[52] U.S. Cl. ................... 228/119; 29/402.07; 29/402.08
[58] Field of Search ............... 228/119, 191, 264, 172; 29/402.08, 402.07, 890.031

[56] References Cited

U.S. PATENT DOCUMENTS

3,191,909 6/1965 Reischl .................................. 30/168
4,718,156 1/1988 Cole .
4,937,936 7/1990 Schill et al. .

Primary Examiner—Kenneth J. Ramsey
Attorney, Agent, or Firm—John B. Hardaway, III; Jeffrey L. Wilson; J. Bennett Mullinax

[57] ABSTRACT

A method for retrofitting metal fiber felt in polymer filtration devices comprising removing the filter from the outer shield and the exhausted metal fiber felt.

2 Claims, 8 Drawing Sheets

METHOD OF RETROFITTING METAL FIBER FELT IN POLYMER FILTRATION DEVICES

FIELD OF THE INVENTION

This method relates generally to the art of reclaiming components of filtration devices, and most specifically, to retrofitting the metal fiber felt found in polymer filtration devices.

BACKGROUND OF THE INVENTION

Methods for retrofitting various filtering components have been pursued for many years. U.S. Pat. No. 4,937,936 to Schill, et al. discloses a method for attaching a noise-reducing filter to an electrical connector. In U.S. Pat. No. 4,718,156 to Cole, a method is described for installing a filter assembly to an exhaust system.

SUMMARY OF THE INVENTION

It is an object of this invention to provide a novel method for reclaiming exhausted filters used to strain polymers. It is a further object of this invention to provide a method for refitting the metal fiber felt utilized by polymer filtration devices. It is a still further object of this invention to allow tremendous savings to plants using filtration devices reclaimable by this method.

These, as well as other objects, are accomplished by a method for retrofitting the metal fiber felt in polymer filtration devices, which method comprises removing from the filter the outer shield and the exhausted metal fiber felt. New metal fiber felt is retrofitted to the original filter and the outer shield is welded back to the end caps.

DETAILED DESCRIPTION

In accordance with this invention it has been discovered that filters used for straining polymers in the production of various products such as photographic film, plastic bottles, and the like may be reclaimed if the exhausted metal fiber felt is removed and replaced. It has also been found that such a method of reclamation will save an enormous amount of money for plants which produce products from polymers. It has additionally been found that such reclamation will protect the environment by allowing far fewer filters to be discarded. Other advantages will become apparent giving with reference the various figures of drawing.

Figure 1:
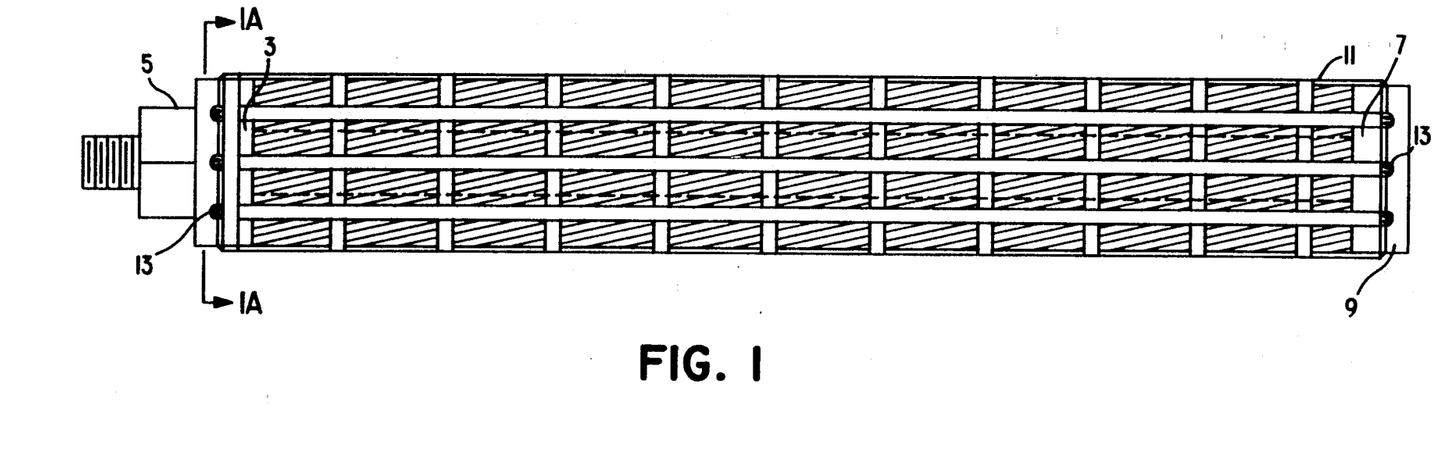
FIG. 1 of the drawings illustrates a polymer filtration device of the type which is retrofittable by the disclosed method.
Figure 1A:
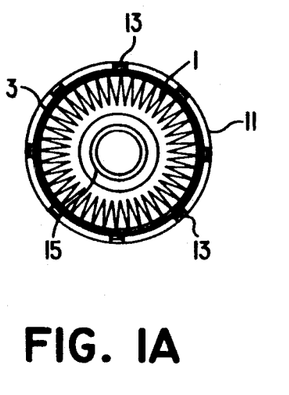
FIG. 1a of the drawings illustrates a section taken on the line A—A of FIG. 1.

FIG. 1 of the drawings illustrates a polymer filtration device comprising old metal fiber felt 1 including weld ring 3 which is welded to first end cap 5. Weld ring 7 which is welded to second end cap 9. Outer shield 11 is welded around the outer portions of first and second end caps 5 and 9, respectively. It is noted that the method of retrofitting hereinafter described is not limited to the illustrated configuration of filter 1, and that polymer filters of similar designs may also be reclaimed by this method.

Figure 2:
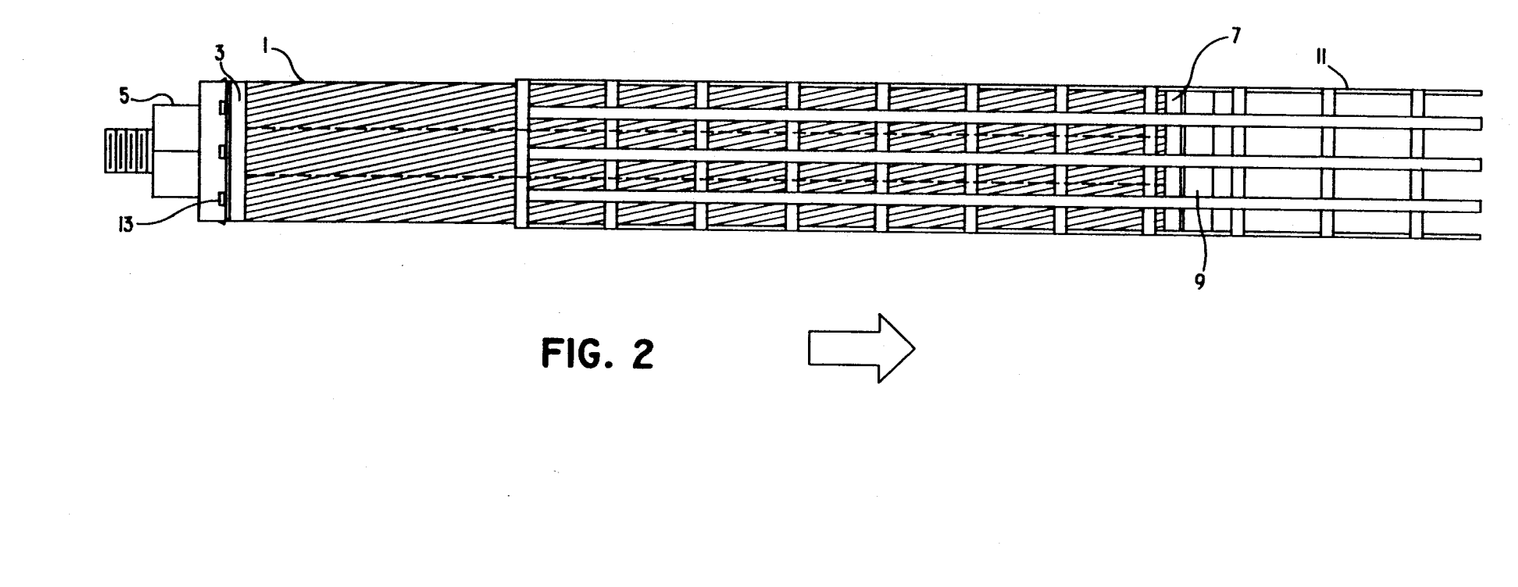
FIG. 2 of the drawings illustrates the outer shield being removed.

As illustrated in FIGS. 1 and 2, shield 11 is spot welded around the outer portions of first and second end caps 5 and 9, respectively. The first step is to dismember the ends of shield 11 from each point of weld 13. It may be necessary to sever the shield itself, in a lengthwise fashion, in order to easily remove it from around the old metal fiber felt 1. Using any number of tools heretofore utilized, this first step is accomplished manually or by machine.

Figure 3:
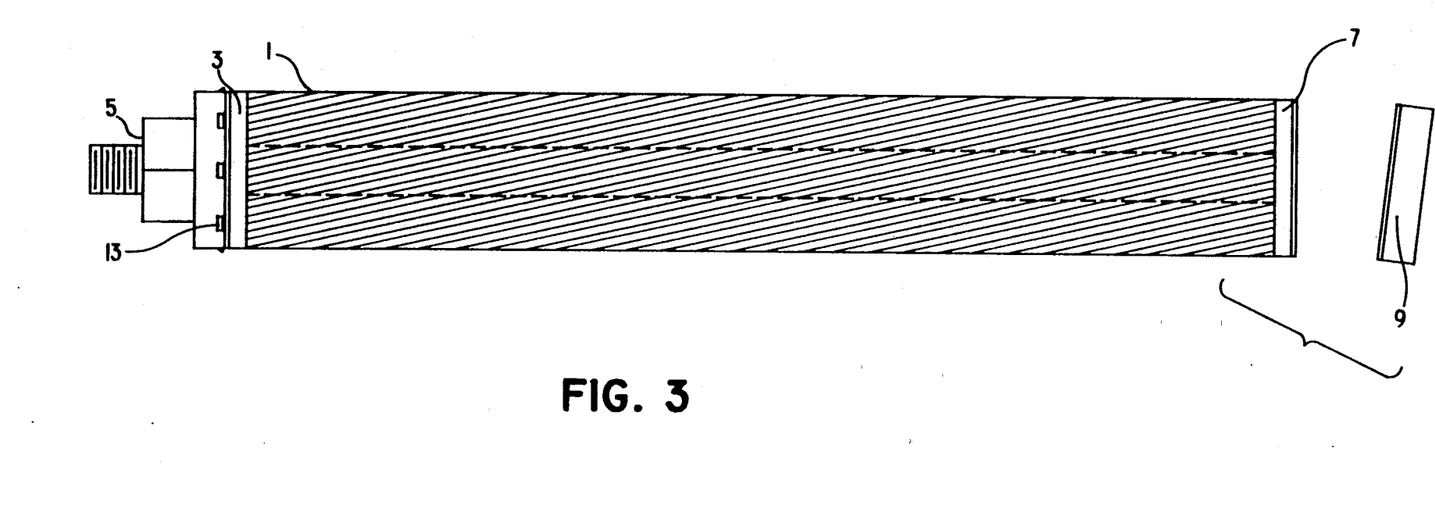
FIG. 3 of the drawings illustrates removal of the second end cap.
Figures 4, 4A:
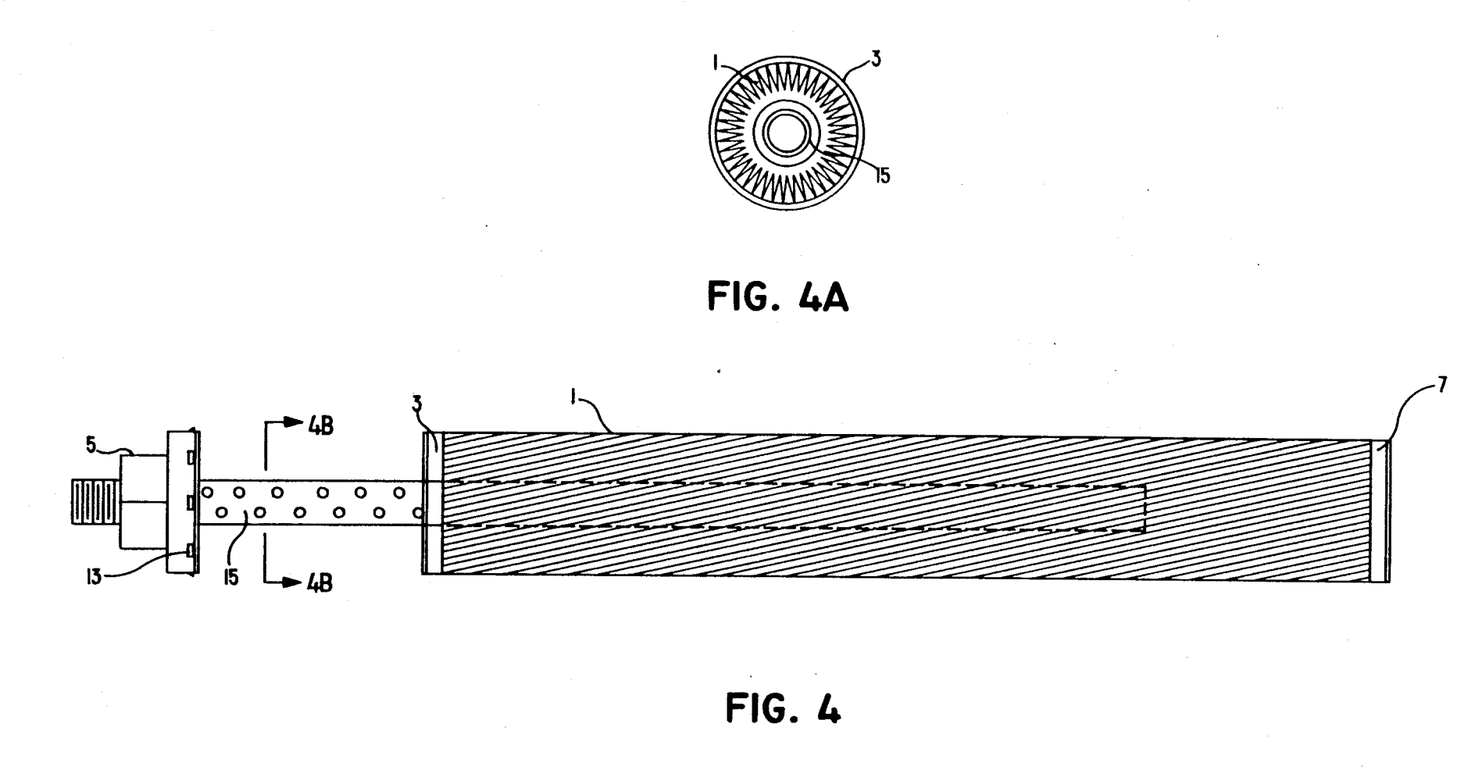
FIG. 4 of the drawings illustrates removal of the old metal fiber felt.
FIG. 4a of the drawings illustrates a section taken on the line B—B of FIG. 4.
Figure 5:
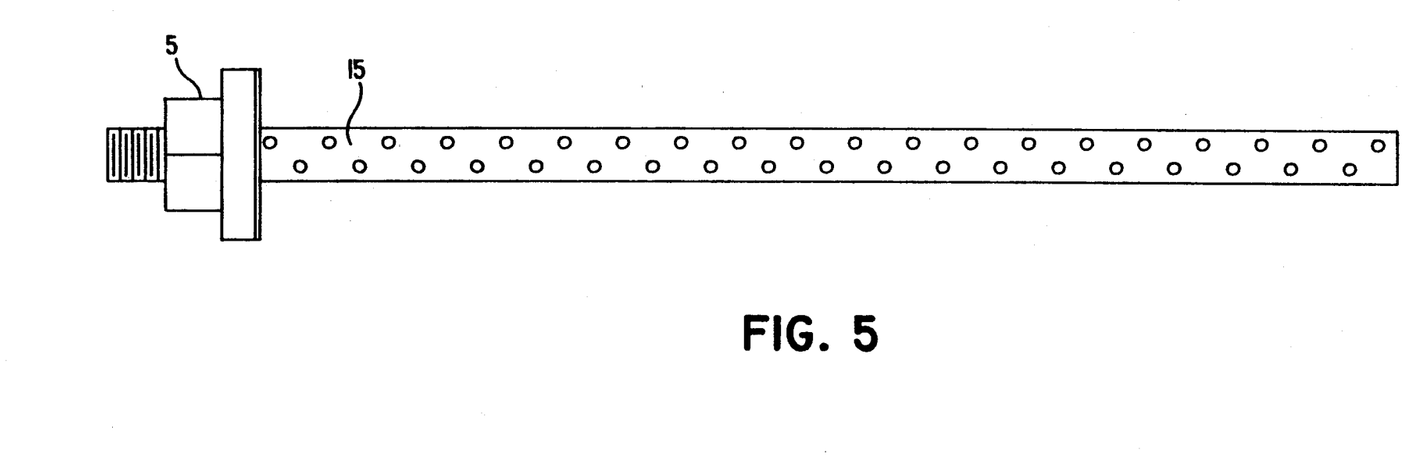
FIG. 5 of the drawings illustrates the inner cylindrical member.

As illustrated in FIG. 3, second end cap 9 is removed from weld ring 7. This is accomplished using a lathe or common hand tools to break the welds which hold weld ring 7 to second end cap 9. In like manner, weld ring 3 is disengaged from end cap 5 such that old metal fiber felt 1, its integrity spent by a number of hours of filtering polymers, is easily slid from inner cylindrical member 15, as illustrated in FIG. 4. The points of weld 13 on first end cap 5 are machined flat. FIG. 5 illustrates inner cylindrical member 15.

Figure 6:
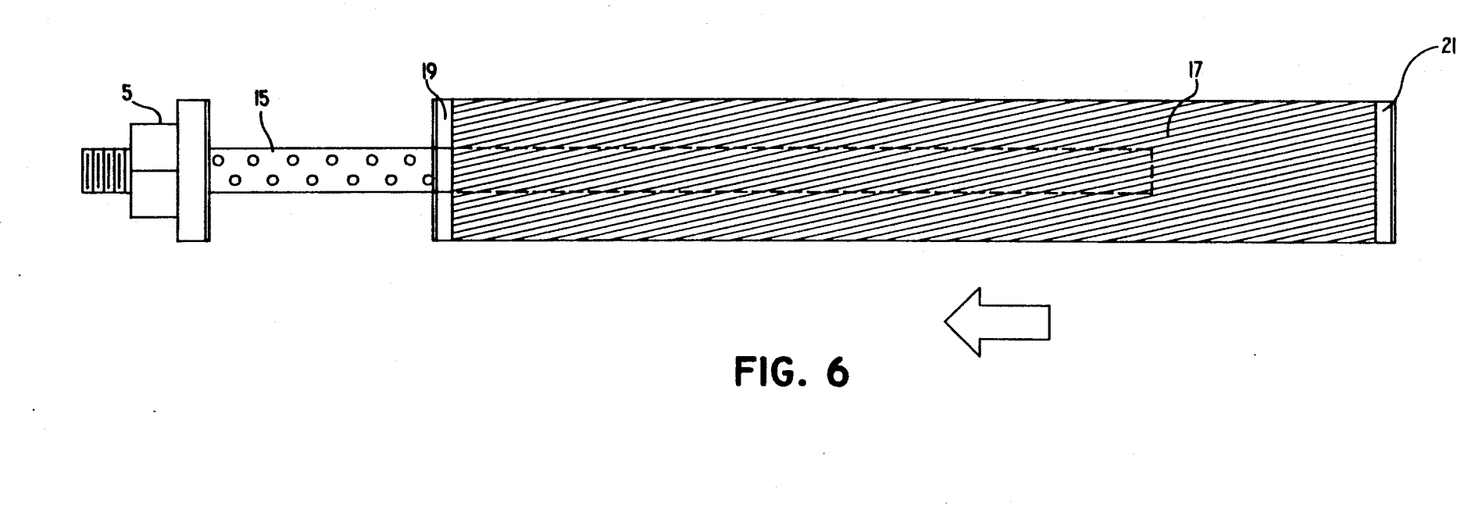
FIG. 6 of the drawings illustrates new metal fiber felt being fitted around the inner cylindrical member.
Figure 7:
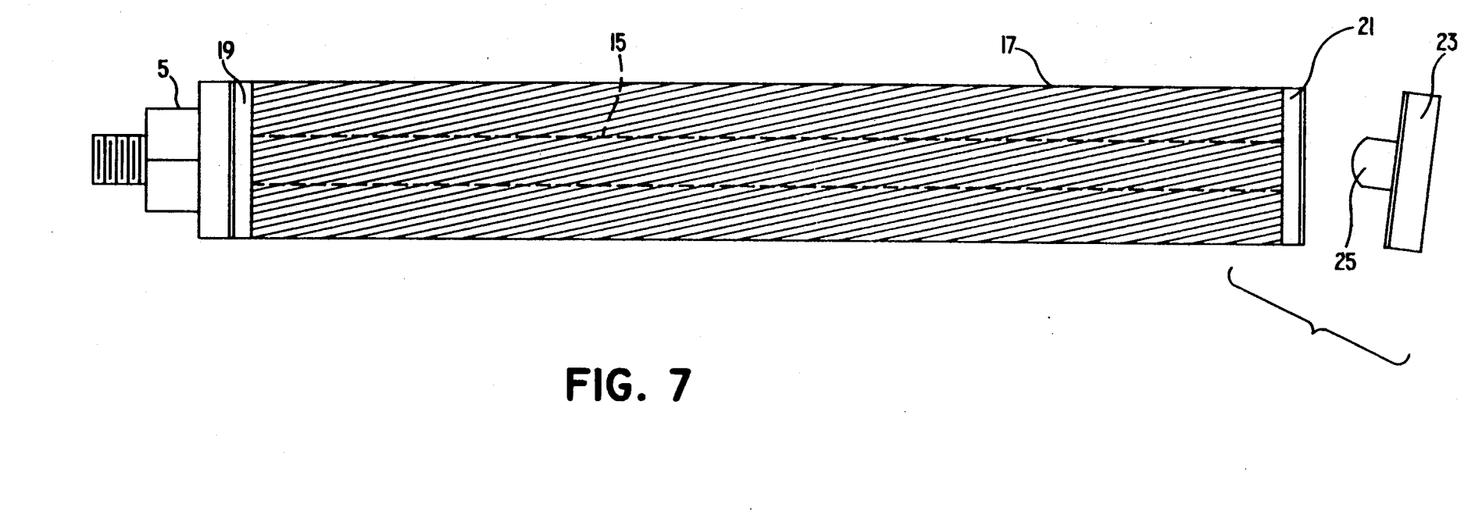
FIG. 7 of the drawing illustrates a new end cap being attached to the end of the inner cylindrical unit and the new metal fiber felt.
Figure 8:
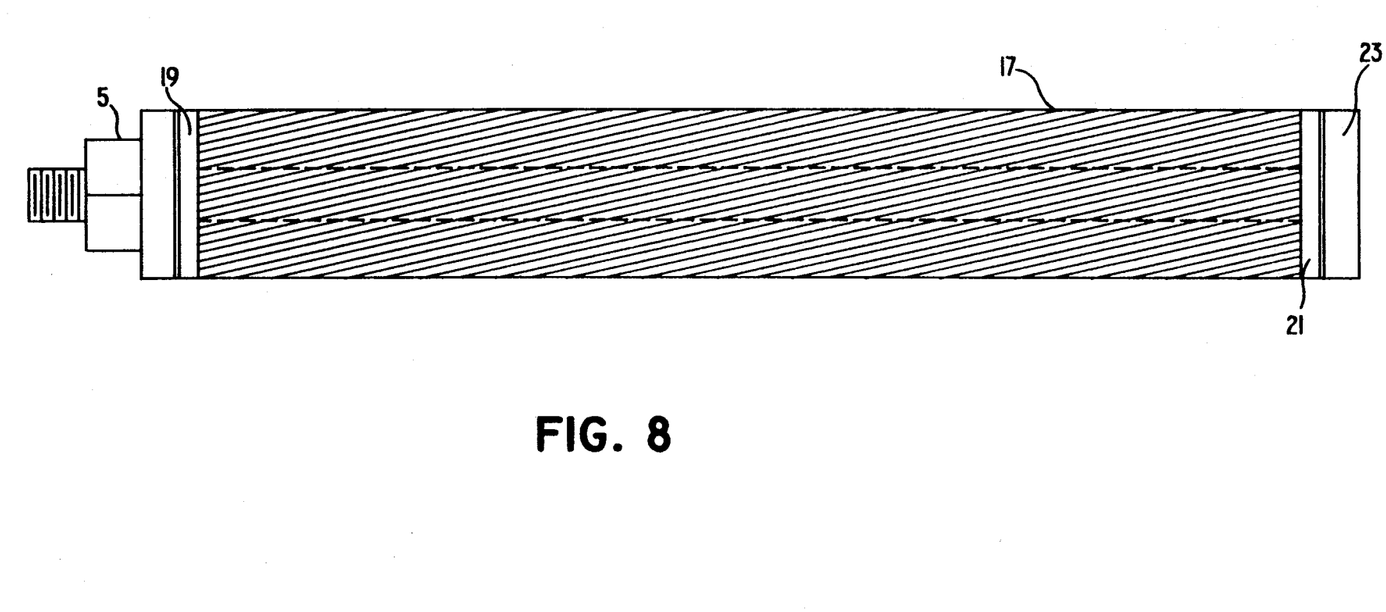
FIG. 8 of the drawings illustrates a retrofitted polymer filter.

New metal fiber felt 17 is refitted around inner cylindrical member, as illustrated in FIG. 6. This new metal fiber felt is manufactured to such specifications to include on each end, weld rings 19 and 21. First end cap 5 is welded to weld ring 19 and weld ring 21 is welded to a new end cap 23, as illustrated in FIG. 7. New end cap 23 includes nipple 25 which engages inside inner cylindrical unit 15 such that inner cylindrical unit 15 is fixedly held. FIG. 8 illustrates new metal fiber felt 17 attached to first end caps 5 and new end cap 23.

Over new fiber felt 17 is placed the original outer shield 11 which is spot welded, as before, around the outer portions of first end cap 5 and new end cap 23, respectively. The filter will look as it did before the method began, as shown in FIG. 1, by it will contain new metal fiber felt 17.

The welds are polished and the filter is tested for leaks.

In accordance with this invention, it is thus seen that a novel method has been provided which allows the reclamation of used polymer filtration devices. The exhausted metal fiber felt of a filter is removed and new metal fiber felt is retrofitted to the original filter. Production costs are dramatically reduced for industries producing products made from polymers, and the environment will endure far fewer discarded filters. As various modifications become apparent to those familiar with the art, such modifications may be practiced without departing in any way from the spirit and scope of the following appended claims.

That which is claimed is:

1. A method for retrofitting metal fiber felt of polymer filtration devices, said method comprising the steps of:

a. breaking the points of weld which attach the outer shield around the outer portions of said first and second end caps;
b. sliding said outer shield from around the old metal fiber felt;
c. breaking the points of weld which attach the weld rings to the undersides of said first and said second end caps, said weld rings affixed to each end of said old metal fiber felt;
d. removing said second end cap from the second end of the inner cylindrical member;
e. sliding said old metal fiber felt from around said inner cylindrical member;
f. flattening the points of weld on the outer portions of said first end cap;
g. sliding new metal fiber felt around said inner cylindrical member;
h. welding the weld ring located at the top end of said new metal fiber felt to the underside of said first end cap;
i. welding the weld ring located at the bottom end of said metal fiber felt to the underside of a new end cap, said new end cap including a nipple which engages inside said inner cylindrical member such that said inner cylindrical member is fixedly held;
j. spot welding said outer shield around the outer portions of said first end cap and said new end cap;
k. polishing each weld;
l. testing said filter for leaks.

2. The method according to claim 1 wherein said outer shield is severed in a lengthwise fashion allowing said outer shield to be easily slid from said old metal fiber felt.

* * * * *